(12) United States Patent
Mao

(10) Patent No.: US 10,158,278 B2
(45) Date of Patent: Dec. 18, 2018

(54) VIBRATION MOTOR

(71) Applicant: Lubin Mao, Shenzhen (CN)

(72) Inventor: Lubin Mao, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 212 days.

(21) Appl. No.: 15/416,230

(22) Filed: Jan. 26, 2017

(65) Prior Publication Data
US 2018/0166965 A1 Jun. 14, 2018

(30) Foreign Application Priority Data
Dec. 12, 2016 (CN) .................. 2016 2 1359743 U

(51) Int. Cl.
*H02K 41/03* (2006.01)
*H02K 33/16* (2006.01)

(52) U.S. Cl.
CPC .................. *H02K 33/16* (2013.01)

(58) Field of Classification Search
CPC ............ H02K 33/16; H02K 41/0356; H02K 2201/18; H02K 41/0354; H02K 1/34
USPC ....................................................... 310/12.16
See application file for complete search history.

(56) References Cited

U.S. PATENT DOCUMENTS

| | | | | |
|---|---|---|---|---|
| 4,190,746 A | * | 2/1980 | Harwood | H04R 7/02 381/427 |
| 6,225,712 B1 | * | 5/2001 | Miyamoto | H02K 41/0358 310/12.16 |
| 6,608,541 B2 | * | 8/2003 | Shiraki | H04R 9/06 335/222 |
| 2006/0226714 A1 | * | 10/2006 | Miura | H04R 9/02 310/12.16 |
| 2007/0194635 A1 | * | 8/2007 | Miura | B06B 1/045 310/15 |

* cited by examiner

*Primary Examiner* — Thanh Lam
(74) *Attorney, Agent, or Firm* — Na Xu; IPro, PLLC

(57) ABSTRACT

A vibration motor is provided in the present disclosure. The vibration motor includes a housing with a receiving space; a vibration module, received in the housing; elastic parts, used for suspending the vibration module in the housing; first voice coils, fixed on the housing and used for driving the vibration module to vibrate in the horizontal direction; and a second voice coil, fixed on the housing and used for driving the vibration module to vibrate in the vertical direction.

10 Claims, 7 Drawing Sheets

VIBRATION MOTOR

FIELD OF THE DISCLOSURE

The present disclosure generally relates to the technical filed of vibration motors, and more particularly, to a vibration motor.

BACKGROUND

The vibration motor is a component for converting electrical energy into mechanical energy by using the production principle of electromagnetic force, and the vibration motor is generally installed in portable mobile equipment to generate vibration feedback, for example, vibration feedback of a mobile phone or vibration feedback of a game machine and the like.

In relevant technologies, the vibration motor is only provided with a voice coil under a magnetized magnet in the vertical Z-axis direction, the driving force in the horizontal X-axis direction is maximum, but no driving force is present in the Y-axis and Z-axis directions, the driving force of the electronic device is only in the horizontal X-axis direction, and the vibration motor only vibrates in the horizontal X-axis direction, so that the vibrating direction is single and the vibration effect of the electronic equipment is not obvious.

Therefore, it is desired to provide a vibration motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Embodiment 1

Figure 1:
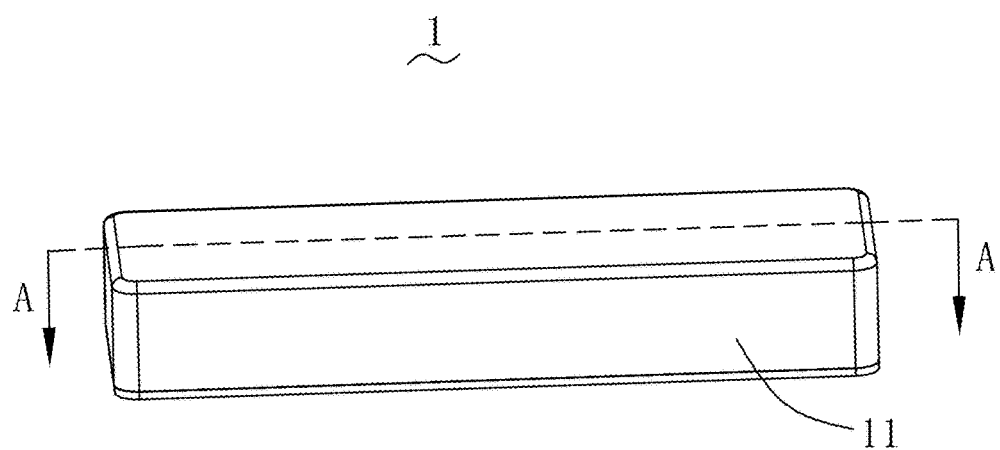
FIG. 1 is a three-dimensional structural diagram of embodiment 1 of a vibration motor of the present disclosure.
Figure 2:
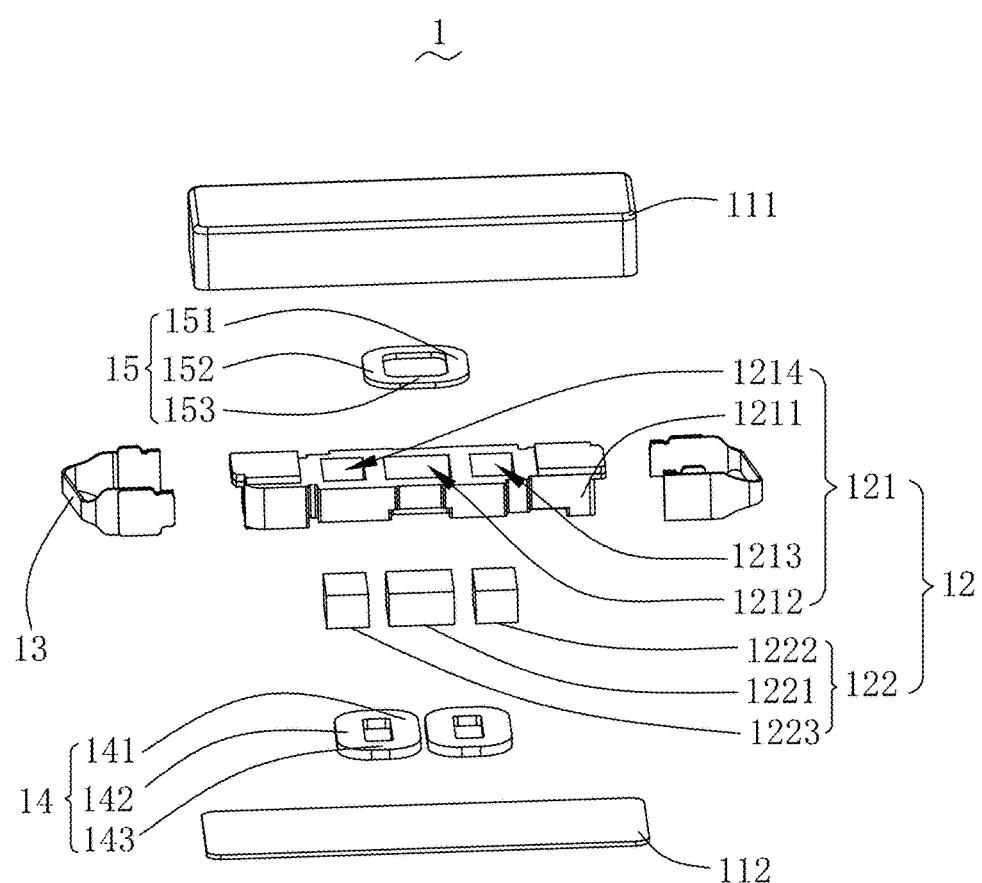
FIG. 2 is a three-dimensional structural exploded view of the vibration motor shown in FIG. 1.
Figure 3:
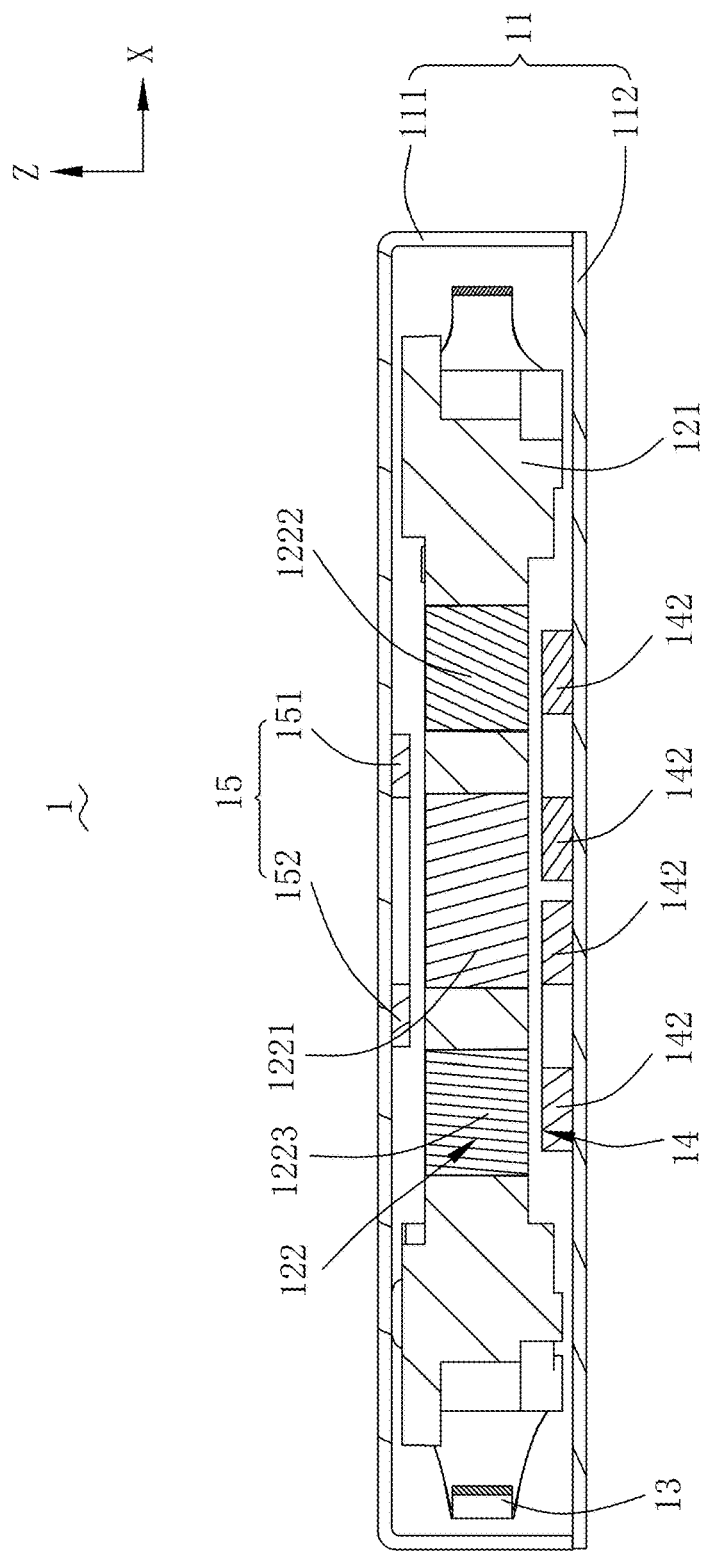
FIG. 3 is a cross-sectional view along an A-A line in FIG. 1.

Simultaneously refer to FIGS. 1-3, wherein FIG. 1 is a three-dimensional structural diagram of embodiment 1 of a vibration motor of the present disclosure; FIG. 2 is a three-dimensional structural exploded view of the vibration motor shown in FIG. 1; and FIG. 3 is a cross-sectional view along an A-A line in FIG. 1. The vibration motor 1 includes a housing 11 with a receiving space, a vibration module 12 received in the housing 11, elastic parts 13 for suspending the vibration module 12 in the housing 11, as well as first voice coils 14 and a second voice coil 15 fixed on the housing 11 and located on two sides of the vibration module 12 respectively.

Referring to FIGS. 2 and 3, the housing 11 includes a shell 111 and a cover plate 112 assembled with the shell 111 to form the receiving space.

The vibration module 12 includes a mass 121 and a magnet set 122 assembled to the mass 121.

The mass 121 includes a mass body 1211, a first receiving groove 1212 penetrating through the mass body 1211 as well as a second receiving groove 1213 and a third receiving groove 1214 which are respectively formed on two sides of the first receiving groove 1212 and penetrate through the mass body 1211. The magnet set 122 includes a first main magnet 1221 as well as a second main magnet 1222 and a third main magnet 1223 which are respectively located on two sides of the first main magnet 1221 and disposed at interval. The first main magnet 1221 is received in the first receiving groove 1212, the second main magnet 1222 is received in the second receiving groove 1213, and the third main magnet 1223 is received in the third receiving groove 1214.

In this embodiment, the first main magnet 1221, the second main magnet 1222 and the third main magnet 1223 are all magnetized in the vertical direction (Z-axis direction shown in FIG. 3), the magnetized directions of the first main magnet 1221 and the second main magnet 1222 are opposite, and the magnetized directions of the second main magnet 1222 and the third main magnet 1223 are same. In this embodiment, specifically, one end of the first main magnet 1221 close to the cover plate 112 is an S pole, while the other end far from the cover plate 112 is an N pole; one end of each of the second main magnet 1222 and the third main magnet 1223 close to the cover plate 112 is an N pole, while the other end far from the cover plate 112 is an S pole. Of course, in other embodiments, the first main magnet 1221 can also be magnetized reversely, that is, one end of the first main magnet 1221 close to the cover plate 112 is an N pole.

The first voice coils 14 are fixed on the cover plate 112, and the second voice coil 15 is fixed on the shell 111. In this embodiment, two first voice coils 14 are provided; and the first voice coils 14 are used for driving the vibration module 12 to vibrate in the horizontal direction (X-axis direction shown in FIG. 3). The first voice coils 14 are roughly ring-shaped. Each first voice coil 14 includes a first voice coil portion 141, a first connecting portion 143 and a second voice coil portion 142 connected in sequence, and the directions of current flowing through the first voice coil portion 141 and current flowing through the second voice coil portion 142 are opposite. The first voice coil portion 141 is disposed at a position corresponding to the first main magnet 1221, and the second voice coil portion 142 is disposed at a position corresponding to the second main magnet 1222 or the third main magnet 1223. By the aforesaid setting of the first voice coils 14, magnetic lines penetrating through the first voice coils 14 are mostly in the vertical direction, so that the first voice coils 14 interact with the magnet set 122 to drive the vibration module 12 to vibrate in the X-axis direction.

As an improvement of the aforesaid embodiment, one first voice coil 14 may also be provided; the first voice coil 14 includes a first voice coil portion 141 and a second voice coil portion 142; the first voice coil portion 141 is disposed at a position corresponding to the second main magnet 1222, and the second voice coil portion 142 is disposed at a position corresponding to the third main magnet 1223.

One second voice coil 15 is provided for driving the vibration module 12 to vibrate in the vertical direction (Z-axis direction shown in FIG. 3). The second voice coil 15 is also ring-shaped. The second voice coil 15 includes a third voice coil portion 151, a fourth voice coil portion 152 and a second connecting portion 153 for connecting the third voice coil portion 151 and the fourth voice coil portion 152, and the directions of current flowing through the third voice coil portion 151 and current flowing through the fourth voice coil portion 152 are opposite. The third voice coil portion 151 is disposed at a position between the first main magnet 1221 and the second main magnet 1222, and the fourth voice coil portion 152 is disposed at a position between the first main magnet 1221 and the third main magnet 1223. By disposing the second voice coil 15, magnetic lines penetrating through the second voice coil 15 are mostly in the horizontal direction, so that the second voice coil 15 interacts with the magnet set 122 to drive the vibration module 12 to vibrate in the Z-axis direction.

In this embodiment, two elastic parts 13 are provided, one end of each elastic part 13 is connected with the mass 121, while the other end is fixed with the housing 11, so that the mass 121 is suspended in the housing 11.

Embodiment 2

Figure 4:
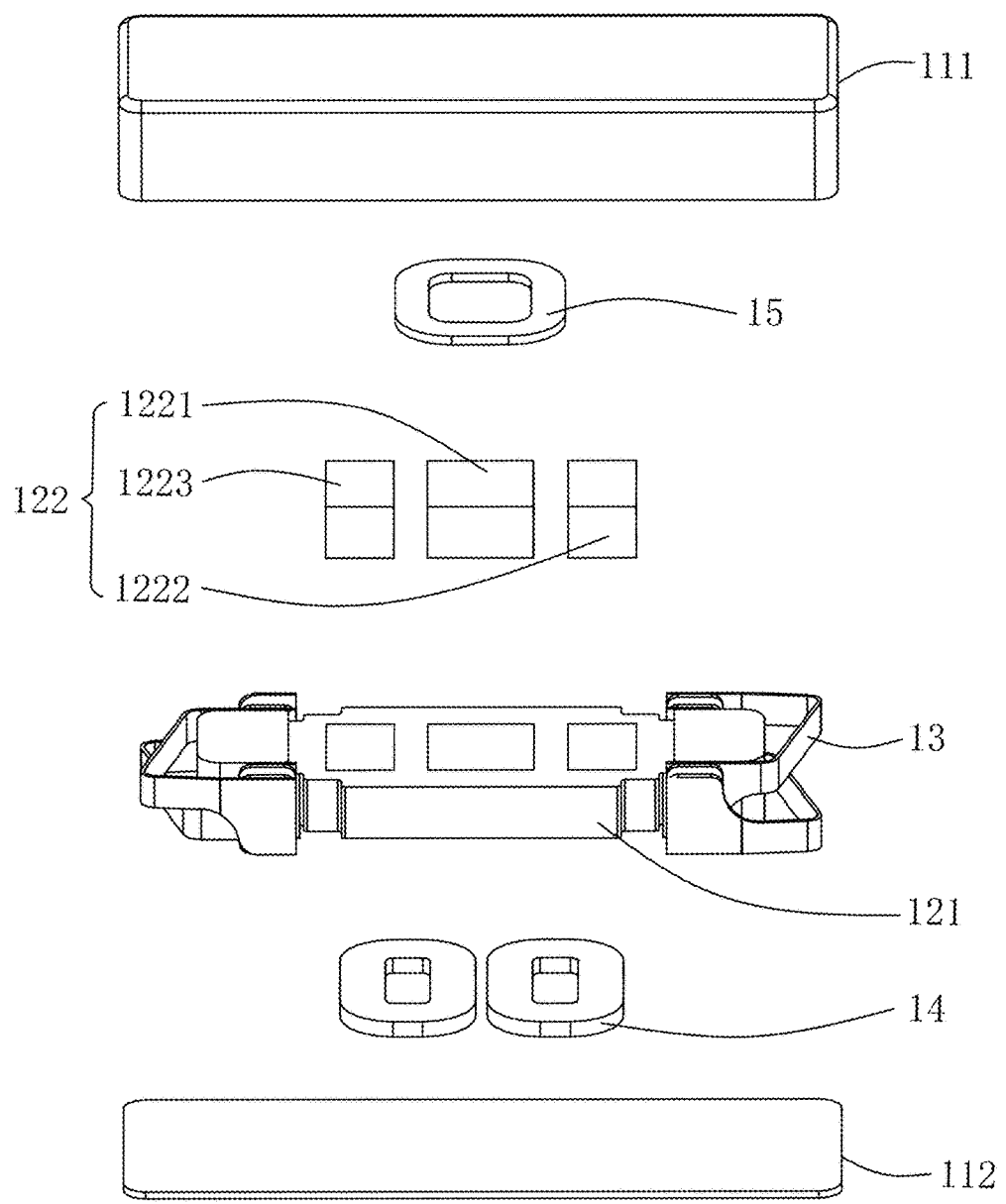
FIG. 4 is a three-dimensional structural exploded view of embodiment 2 of the vibration motor of the present disclosure.

FIG. 4 shows a three-dimensional structural exploded view of embodiment 2 of the vibration motor of the present disclosure.

Four elastic parts 13 can also be provided, and other structures are roughly same as those in embodiment 1. Two ends of the mass 121 are fixed with the housing 11 via two elastic parts 13 respectively, and the two elastic parts 13 at each end of the mass 121 are arranged vertically. Specifically, respective one end of the two elastic parts 13 is fixed on two sides of the mass 121, and the other ends of the two elastic parts 13 are respectively fixed with the housing 11, so that the stability of respective vibration in the X-axis and Z-axis directions can be further guaranteed.

Embodiment 3

Figure 5:
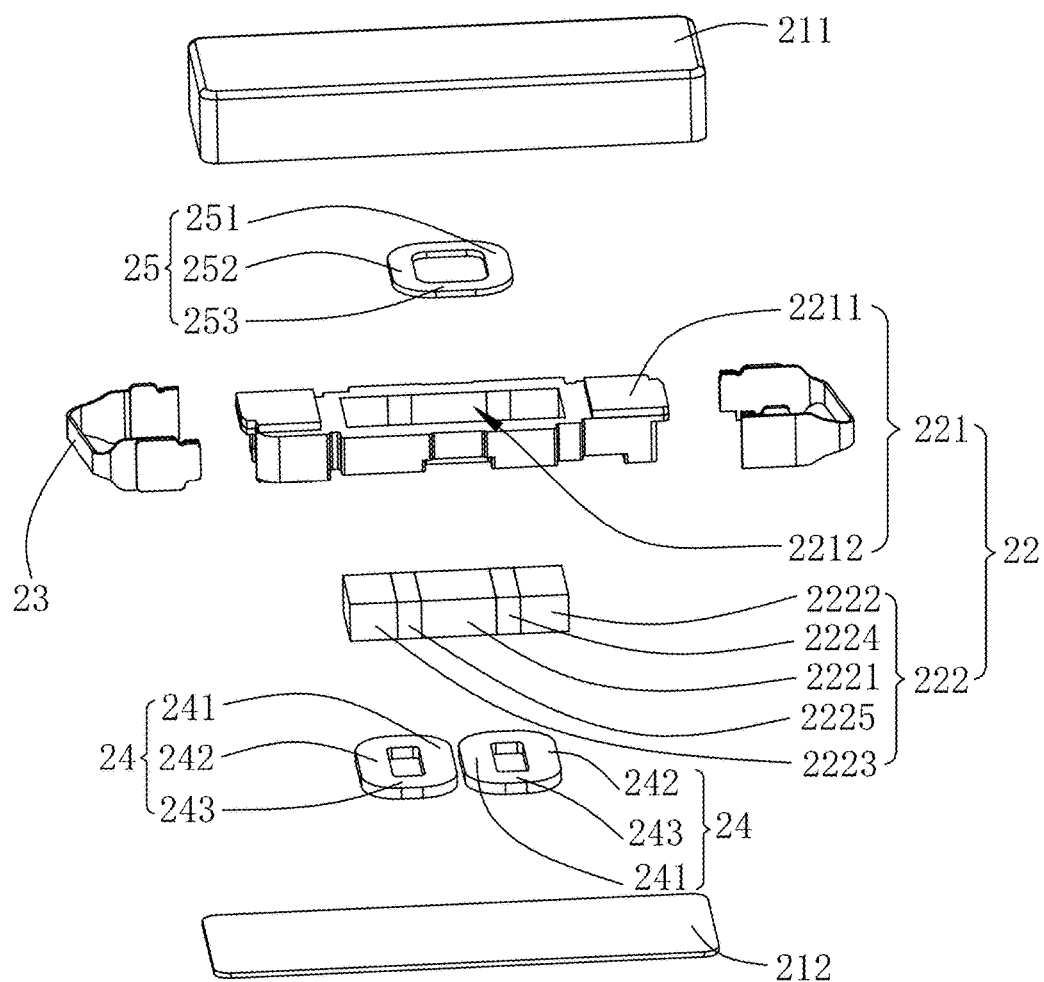
FIG. 5 is a three-dimensional structural exploded view of embodiment 3 of the vibration motor of the present disclosure.
Figure 6:
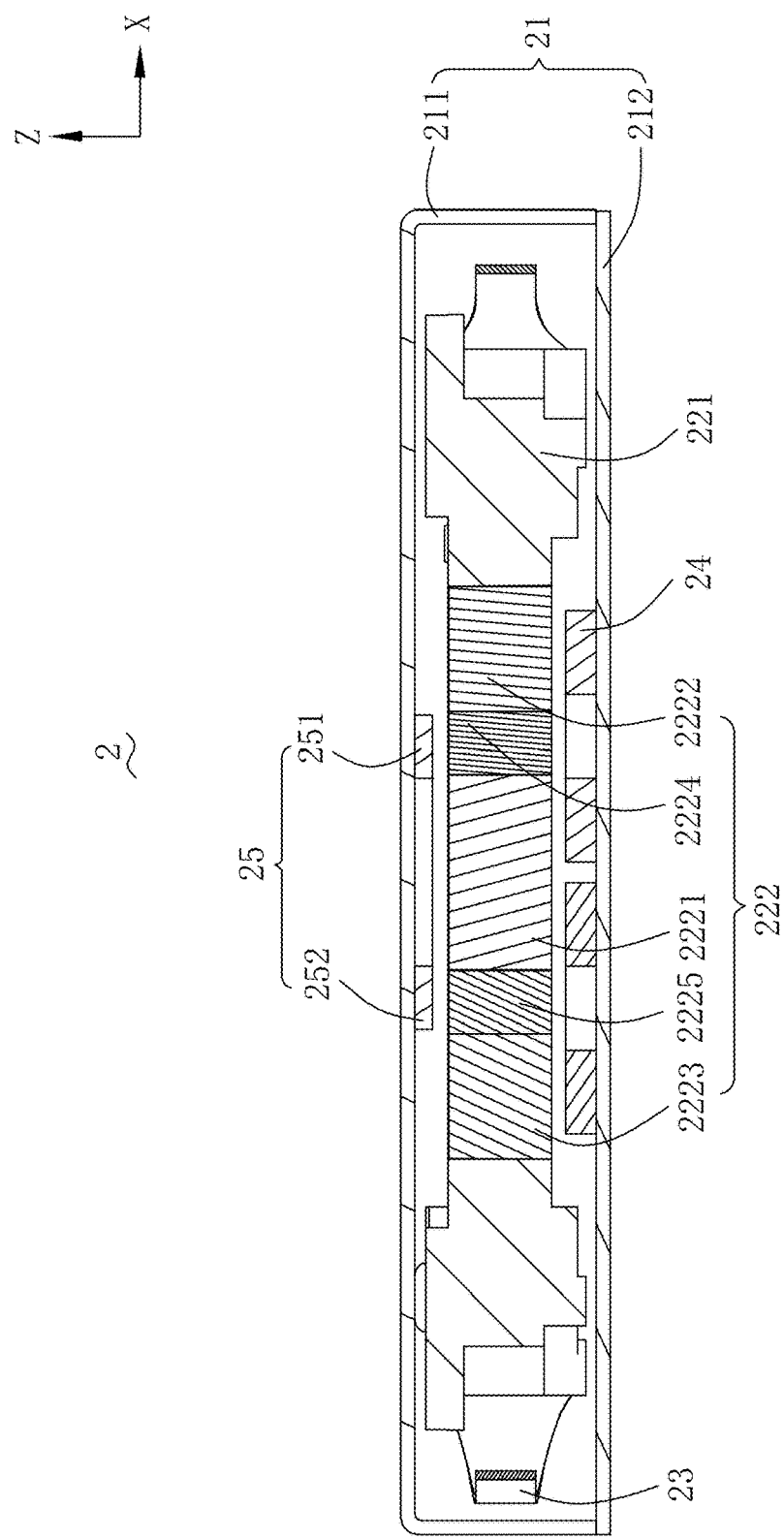
FIG. 6 is a cross-sectional view of embodiment 3 of the vibration motor of the present disclosure.

Referring to FIGS. 5 and 6, FIG. 5 is a three-dimensional structural exploded view of embodiment 3 of the vibration motor of the present disclosure; and FIG. 6 is a cross-sectional view of embodiment 3 of the vibration motor of the present disclosure. The vibration motor 2 includes a housing 21 with a receiving space, a vibration module 22 received in the housing 21, elastic parts 23 for suspending the vibration module 22 in the housing 21, first voice coils 24 fixed on the housing 21 and located below the vibration module 22 and a second voice coil 25 fixed on the housing 21 and located above the vibration module 22.

The housing 21 includes a shell 211 and a cover plate 212 assembled with the shell 211 to form the receiving space. The first voice coils 24 are fixed on the cover plate 212, and the second voice coil 25 is fixed on the shell 211.

The vibration module 22 includes a mass 221 and a magnet set 222 assembled to the mass 221.

The mass 221 includes a mass body 2211 and a receiving groove 2212 penetrating through the mass body 2211. In this embodiment, one receiving groove 2212 is provided. The magnet set 222 includes a first main magnet 2221 as well as a second main magnet 2222 and a third main magnet 2223 which are respectively located on two sides of the first main magnet 2221 and disposed at interval. The magnet set 222 further includes a first vice magnet 2224 sandwiched between the first main magnet 2221 and the second main magnet 2222, and a second vice magnet 2225 sandwiched between the first main magnet 2221 and the third main magnet 2223; one receiving groove 2212 is provided, and the magnet set 222 is received in the receiving groove 2212.

In this embodiment, the first main magnet 2221, the second main magnet 2222 and the third main magnet 2223 are all magnetized in the vertical direction (Z-axis direction shown in FIG. 6), the magnetized directions of the first main magnet 2221 and the second main magnet 2222 are opposite, and the magnetized directions of the second main magnet 2222 and the third main magnet 2223 are same. In this embodiment, specifically, one end of the first main magnet 2221 close to the cover plate 212 is an S pole, while the other end far from the cover plate 212 is an N pole; one end of each of the second main magnet 2222 and the third main magnet 2223 close to the cover plate 212 is an N pole, while the other end far from the cover plate 212 is an S pole. The first vice magnet 2224 and the second vice magnet are magnetized in the horizontal direction (X-axis direction shown in FIG. 3). Thus, the magnet set 222 can be arranged in a Halbach array. The magnetized directions of the first vice magnet 2224 and the second vice magnet 2225 are perpendicular to the magnetized direction of the first main magnet 2221; in this embodiment, one end of the first vice magnet 2224 close to the first main magnet 2221 is an S pole, while the other end far from the first main magnet 2221 is an N pole; one end of the second vice magnet 2225 close to the first main magnet 2221 is an S pole, while the other end far from the first main magnet is an N pole. Of course, the arrangement mode of the magnet set 222 is not limited to this embodiment, and can also be other Halbach arrangement mode.

Two first voice coils 24 are provided in this embodiment; and the first voice coils 24 are used for driving the vibration module 22 to vibrate in the horizontal direction (X-axis direction shown in FIG. 6). The first voice coils 24 are roughly ring-shaped. Each first voice coil 24 includes a first voice coil portion 241, a second voice coil portion 242 and a first connecting portion 243 for connecting the first voice coil portion 241 and the second voice coil portion 242, and the directions of current flowing through the first voice coil portion 241 and current flowing through the second voice coil portion 242 are opposite. The first voice coil portion 241 of each first voice coil 24 is disposed at a position corresponding to the first main magnet 2221, and the second voice coil portion 242 of each first voice coil 24 is disposed at a position corresponding to the second main magnet 2222 or the third main magnet 2223. By the aforesaid setting of the first voice coils 24, magnetic lines penetrating through the first voice coils 24 are mostly in the vertical direction, so that the first voice coils 24 interact with the magnet set 222 and drive the vibration module 22 to vibrate in the X-axis direction.

The second voice coil 25 includes a third voice coil portion 251 and a fourth voice coil portion 252; the third voice coil portion 251 is correspondingly disposed at the first vice magnet 2224, and the fourth voice coil portion 252 is correspondingly disposed at the second vice magnet 2225.

Specifically, the third voice coil portion 251 of the second voice coil 25 is disposed at a position corresponding to the first vice magnet 2224, and the fourth voice coil portion 252 is disposed at a position corresponding to the second vice magnet 2225.

The second voice coil 25 interacts with the first vice magnet 2224 and the second vice magnet 2225 which are magnetized horizontally so as to drive the vibration module 22 to vibrate in the Z-axis direction, and the first voice coils 24 interact with the first main magnet 2221, the second main magnet 2222 and the third main magnet 2223 which are magnetized vertically so as to drive the vibration module 22 to vibrate in the vertical direction. By arranging the magnet set 222 in a Halbach array, magnetic lines penetrating through the second voice coil 25 are increased while the X-axis driving force is guaranteed, so that the driving force of vibration in the Z-axis direction is improved.

In this embodiment, two elastic parts 23 are provided, one end of each elastic part 23 is connected with the mass 221, while the other end is fixed with the housing 21.

Embodiment 4

Figure 7:
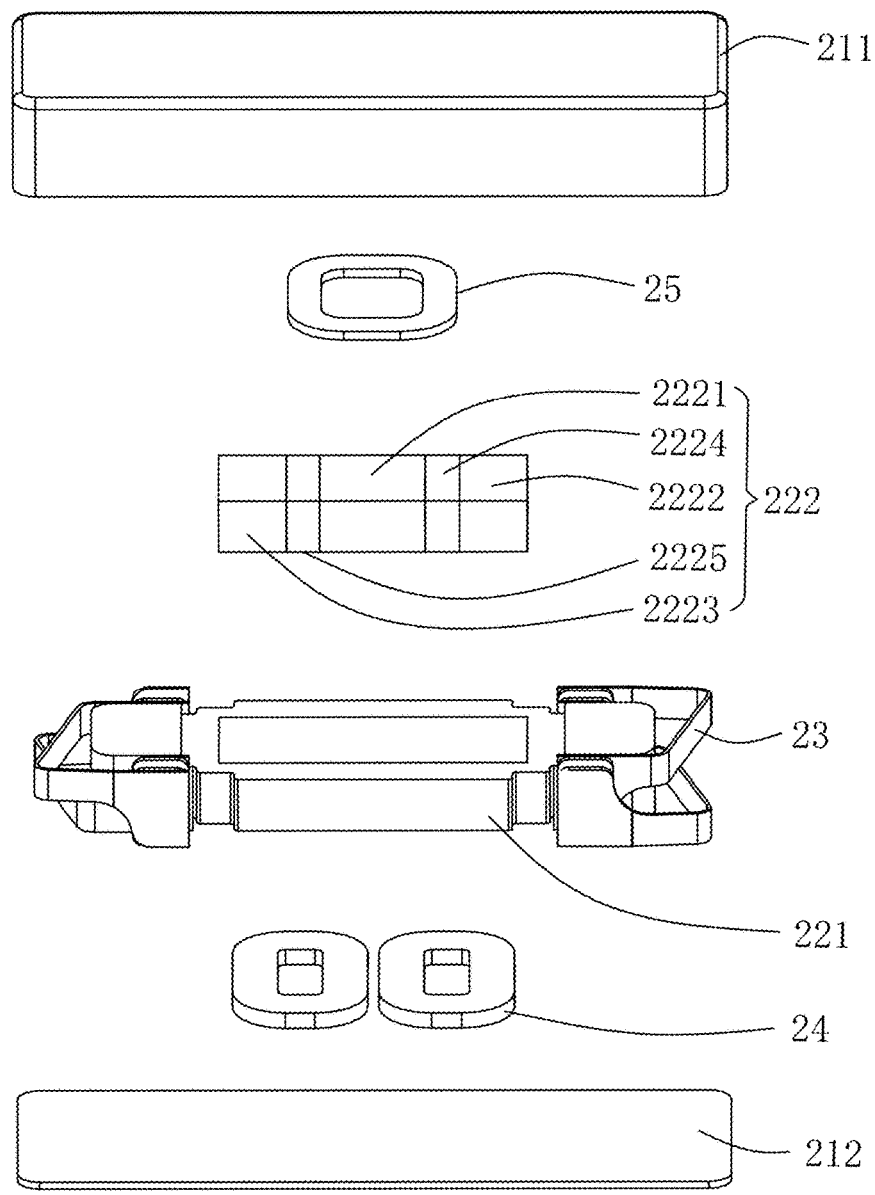
FIG. 7 is a three-dimensional structural exploded view of embodiment 4 of the vibration motor of the present disclosure.

Refer to FIG. 7, which is a three-dimensional structural exploded view of embodiment 4 of the vibration motor of the present disclosure. Four elastic parts 23 can also be provided, and other structures are roughly same as those in embodiment 3. Two ends of the mass 221 are fixed with the housing 21 via two elastic parts 23 respectively, and the two elastic parts 23 at each end of the mass 221 are arranged vertically. Specifically, respective one end of the two elastic parts 23 is fixed on two sides of the mass 221, and the other ends of the two elastic parts 23 are respectively fixed with the housing 21, so that the stability of respective vibration in the X-axis and Z-axis directions can be further guaranteed.

Compared with relevant technologies, the vibration motor in the present disclosure has the advantages that the second voice coil added inside interacts with the magnets to provide driving force in the Z-axis direction, so that the vibration motor can vibrate in the X-axis or Z-axis direction and the vibrating performance of the vibration motor is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
a housing with a receiving space;
a vibration module, received in the housing;
elastic parts, used for suspending the vibration module in the housing;
first voice coils, fixed on the housing and used for driving the vibration module to vibrate in the horizontal direction; and
a second voice coil, fixed on the housing and used for driving the vibration module to vibrate in the vertical direction.

2. The vibration motor as described in claim 1, wherein the vibration module comprises a mass and a magnet set assembled to the mass, and the first voice coils and the second voice coil are respectively disposed on two sides of the mass.

3. The vibration motor as described in claim 2, wherein the magnet set comprises a first main magnet, a second main magnet and a third main magnet which are magnetized in the vertical direction; the second main magnet and the third main magnet are respectively located on two sides of the first main magnet and disposed at interval; the magnetized directions of the first main magnet and the second main magnet are opposite, and the magnetized directions of the second main magnet and the third main magnet are same.

4. The vibration motor as described in claim 3, wherein two first voice coils are provided; each voice coil comprises a first voice coil portion and a second voice coil portion; the first voice coil portion is disposed at a position corresponding to the first main magnet, and the second voice coil portion is disposed at a position corresponding to the second main magnet or the third main magnet.

5. The vibration motor as described in claim 3, wherein one first voice coil is provided; the first voice coil comprises a first voice coil portion and a second voice coil portion; the first voice coil portion is disposed at a position corresponding to the second main magnet, and the second voice coil portion is disposed at a position corresponding to the third main magnet.

6. The vibration motor as described in claim 3, wherein the second voice coil comprises a third voice coil portion and a fourth voice coil portion; the third voice coil portion is disposed at a position between the first main magnet and the second main magnet, and the fourth voice coil portion is disposed at a position between the first main magnet and the third main magnet.

7. The vibration motor as described in claim 6, wherein the vibration module further comprises a first vice magnet sandwiched between the first main magnet and the second main magnet, and a second vice magnet sandwiched between the first main magnet and the third main magnet; the magnetized directions of the first vice magnet and the second vice magnet are perpendicular to the magnetized direction of the first main magnet; the third voice coil portion is disposed at a position corresponding to the first vice magnet, and the fourth voice coil portion is disposed at a position corresponding to the second vice magnet.

8. The vibration motor as described in claim 2, wherein two elastic parts are provided, one end of each elastic part is connected with the mass, while the other end is fixed with the housing.

9. The vibration motor as described in claim 2, wherein four elastic parts are provided, one end of each elastic part is connected with the mass, while the other end is fixed with the housing.

10. The vibration motor as described in claim 1, wherein the housing comprises a shell and a cover plate assembled with the shell to form the receiving space, the first voice coils are fixed on the cover plate, and the second voice coil is fixed on the shell.

* * * * *